(12) United States Patent
Cramer

(10) Patent No.: US 6,863,967 B2
(45) Date of Patent: Mar. 8, 2005

(54) COEXTRUDED MULTI COLOR PLASTIC SHEETS

(75) Inventor: Robert Cramer, Richmond, IN (US)

(73) Assignee: Primex Plastics Corporation, Richmond, IN (US)

( * ) Notice: Subject to any disclaimer, the term of this patent is extended or adjusted under 35 U.S.C. 154(b) by 0 days.

(21) Appl. No.: 10/436,846

(22) Filed: May 13, 2003

(65) Prior Publication Data

US 2003/0203177 A1 Oct. 30, 2003

Related U.S. Application Data

(62) Division of application No. 09/894,032, filed on Jun. 28, 2001.

(51) Int. Cl.[7] .................................................. B32B 7/02
(52) U.S. Cl. ........................ 428/220; 428/500; 428/515; 428/516
(58) Field of Search ................................ 428/220, 500, 428/516, 515

(56) References Cited

U.S. PATENT DOCUMENTS

| | | | |
|---|---|---|---|
| 2,632,204 A | 3/1953 | Murray ....................... 425/132 |
| 2,803,041 A | 8/1957 | Hill et al. ...................... 264/75 |
| 3,274,646 A | 9/1966 | Krystof .................... 425/131.1 |
| 3,792,945 A | 2/1974 | Randall ....................... 425/132 |
| 4,085,246 A | 4/1978 | Buser et al. ................. 428/220 |
| 4,128,386 A | 12/1978 | Wissinger et al. ........... 425/462 |
| 4,179,760 A | 12/1979 | Nakagawa ...................... 4/584 |
| 4,185,951 A | * | 1/1980 | Webermeier et al. .... 425/133.5 |
| 4,293,603 A | 10/1981 | Hayman-Chaffey et al. .. 428/86 |
| 4,329,196 A | 5/1982 | Rawlinson ................... 156/243 |
| 4,542,686 A | 9/1985 | Bansal ......................... 99/483 |
| 4,643,925 A | 2/1987 | Smith et al. ............... 428/36.6 |
| 4,861,630 A | 8/1989 | Mihalich .................... 428/34.1 |
| 4,875,410 A | 10/1989 | Lee et al. ..................... 101/170 |
| 5,114,789 A | 5/1992 | Reafler ........................ 428/328 |
| 5,286,528 A | 2/1994 | Reafler ..................... 427/412.1 |
| 5,712,009 A | 1/1998 | Moore et al. ............... 428/35.7 |
| 5,743,064 A | 4/1998 | Bennett .................... 52/718.04 |
| 6,013,222 A | 1/2000 | Douglas et al. ............. 264/514 |
| 6,040,045 A | 3/2000 | Alfonso et al. ............. 428/327 |
| 6,060,009 A | 5/2000 | Welygan et al. ............ 264/167 |
| 6,096,410 A | 8/2000 | Okajima et al. ......... 428/195.1 |
| 6,143,342 A | 11/2000 | Weinstein et al. .......... 426/516 |

(List continued on next page.)

OTHER PUBLICATIONS

Unknown Author, "Understanding Vehicle Paint Technology," http://www.standox.de/lack/englisch/guide3.htm, Apr. 12, 2001.

(List continued on next page.)

Primary Examiner—Monique R. Jackson
(74) Attorney, Agent, or Firm—Bose McKinney & Evans LLP

(57) ABSTRACT

The present invention is the apparatus and method for producing a plastic sheet having a pattern produced in a layer therein. The plastic sheet is a single layer sheet or a multi-layer sheet. The pattern is produced by mixing two or more plastic extrudants together in a mixer. The pattern is visible in the layer containing the two or more plastic extrudants because an at least one of the plastic extrudants is at least partially transparent. The mixer used to produce the pattern includes a housing having an end configured to expel the mixture of the two or more extrudants through a plurality of outlets. The mixer further comprises a rotatable shaft and at least one projection coupled to the shaft and rotatable with the shaft, the at least one projection configured to orient the mixture of the two or more extrudants relative to the plurality of outlets in the housing. The mixer further comprising a thrust bearing configured to couple an end of the shaft to the housing.

27 Claims, 9 Drawing Sheets

U.S. PATENT DOCUMENTS

| | | | |
|---|---|---|---|
| 6,206,998 B1 | 3/2001 | Niazy | 156/243 |
| 6,372,164 B1 * | 4/2002 | Bennett et al. | 264/74 |
| 6,420,050 B2 | 7/2002 | Birch et al. | 428/517 |
| 6,444,073 B1 | 9/2002 | Reeves et al. | 156/211 |
| 6,455,171 B2 | 9/2002 | Scheibelhoffer et al. | 428/517 |
| 6,489,019 B1 | 12/2002 | Shah et al. | 428/325 |
| 6,503,588 B1 | 1/2003 | Hayashi et al. | 428/36.7 |

OTHER PUBLICATIONS

Unknown Author, "Spartech Alloy Plastics—Marballoy™," http://www.spartech.com/new-products/marballoy.html, May 11, 2001.

Unknown Author, "Making sense of coverstocks and particle technology," http://www.bowlingindex.com/products/balls/c300cover.htm, Apr. 16, 2001.

Dyer, Kathy., "How to Get the Most out of Pearlescent Pigments," http://www.plasticstechnology.com/articles/199906fa3.html, Jun. 1999.

Unknown Author, "Reactive, Urethane and Plastic," http://www.bowlingindex.com/products/balls/balls.htm, Apr. 16, 2001.

Unknown Author, "Reactive, Urethane & Polyester. Match the ball to the conditions," http://www.bowlingindex.com/products/balls/match.htm, Apr. 17, 2001.

Unknown Author, "Xtreme Boogie," http://www.amfproducts.com/oprods/bb-xb.asp, Apr. 12, 2001.

"Plexiglas DR/ABS", Rohn and Haas, Oct. 1987.

Barnes, G., "High-quality gazebos and Plexiglas® DR® acrylic spas for America' dream backyards of the 90s", Aqua 100, Nov. 1989.

Jost, A., "CAP'N DR™ grows spa manufacturer/distributor's sales with strength and color", Aqua 100, Nov. 1989.

Carter, Claude B., "Changing laws will influence spa manufacturing practices", Aqua 100, 1988.

* cited by examiner

COEXTRUDED MULTI COLOR PLASTIC SHEETS

RELATED APPLICATIONS

This application is a division of application Ser. No. 09/894,032 filed Jun. 28, 2001, the disclosure of which is hereby expressly incorporated by reference.

FIELD OF THE INVENTION

The present invention relates to the production of a plastic sheet and the process and apparatus for producing the plastic sheet and in particular to the production of a plastic sheet having a decorative appearance and, the process and apparatus for producing the plastic sheet with the decorative appearance.

BACKGROUND

Various products have been produced by vacuum forming a plastic sheet into the desired shape of the product. Example products include slides for outdoor play equipment, showers, food trays and hunting accessories. The plastic sheet used in the vacuum forming process typically has an aesthetic side and a non-aesthetic side. The plastic sheet has generally had uniform coloration on both the non-aesthetic side and the aesthetic side.

The plastic sheet is often made from at least two layers of extruded plastic. The first layer is a base layer that is made from recycled plastic and provides the non-aesthetic side. The second layer is a colored layer which contains the coloration for the aesthetic side of the plastic sheet. The use of multiple layers reduces cost by allowing manufacturers to reuse scrap plastic for the base layer (non-aesthetic side) and to minimize the amount of new plastic needed to create the aesthetic side.

SUMMARY OF INVENTION

The present invention is the apparatus and method for producing a plastic sheet having a pattern produced therein.

In one exemplary embodiment, an apparatus for producing a non-linear pattern from a mixture of at least two extrudants in an extrusion process comprising a housing having a first end and a second end and an interior region. The first end of the housing being adapted to receive the mixture of at least two extrudants and the second end of the housing being configured to expel the mixture of the at least two extrudants in a non-linear pattern. The second end of the housing including a plurality of outlets to selectively expel the mixture. The apparatus further includes a shaft having a first end and a second end. The first end of the shaft located proximate to the first end of the housing and the second end of the shaft located proximate to the second end of the housing. The shaft being rotatable relative to the housing about an axis. The apparatus further includes at least one projection coupled to the shaft and rotatable with the shaft. The at least one projection configured to orient the mixture relative to the plurality of outlets in the second end of the housing. The apparatus further comprising a thrust bearing configured to couple the second end of the shaft to the second end of the housing to permit the expulsion of the mixture in a non-linear pattern as the mixture is oriented relative to the plurality of outlets.

In another exemplary embodiment, an apparatus for producing a multi layer plastic extrudant comprising a first extruder configured to extrude a first plastic extrudant, a second extruder configured to extrude a second plastic extrudant, the second plastic extrudant being at least partially transparent and a third extruder configured to extrude a third plastic extrudant. The apparatus further comprises a mixer coupled to the second extruder and the third extruder. The mixer being configured to produce a mixture of the second plastic extrudant and the third plastic extrudant, the mixture including a non-linear pattern. The apparatus further comprising a co-extrusion block comprising a first channel and a second channel, wherein the first channel is coupled to the first extruder to receive the first plastic extrudant to produce a first layer and wherein the second channel is coupled to the mixer to receive the mixture of the second plastic extrudant and the third plastic extrudant to produce a second layer. The second layer containing the non-linear pattern wherein the third plastic extrudant of the mixture is visible within the second layer due to the second plastic extrudant of the mixture being at least partially transparent.

In another exemplary embodiment, the mixer of the preceding embodiment comprising a housing having a first end and a second end and an interior region. The first end of the housing being configured to receive the second plastic extrudant and the third plastic extrudant and the second end of the housing being configured to expel the mixture of the two extrudants through a plurality of outlets. The mixer further comprising a shaft having a first end and a second end. The first end of the shaft located proximate to the first end of the housing and the second end of the shaft located proximate to the second end of the housing. The shaft being rotatable relative to the housing about an axis. The mixer further comprising at least one projection coupled to the shaft and rotatable with the shaft, the at least one projection configured to orient the mixture of the two extrudants relative to the plurality of outlets in the second end of the housing. The mixer further comprising a thrust bearing configured to couple the second end of the shaft to the second end of the housing to permit expulsion of the mixture in a non-linear pattern as the mixture is oriented relative to the plurality of outlets.

In one exemplary embodiment, a plastic sheet is produced comprising a first layer comprising a plastic extrudant and a second layer coupled to the first layer, the second layer comprising at least two other plastic extrudants. The plastic extrudants of the second layer produce a pattern wherein at least one of the plastic extrudants is at least partially transparent such that both of the plastic extrudants are visible in the second layer.

In one exemplary embodiment, a method for producing a plastic sheet, comprising the steps of extruding a first plastic extrudant to produce a first layer, extruding a second plastic extrudant having an appearance, the appearance being at least partially transparent and including a first color, and extruding a third plastic extrudant having another appearance, the other appearance including a second color. The method further comprising mixing the second plastic extrudant and the third plastic extrudant to produce a mixture, the mixture including a non-linear pattern. The method further comprising applying the mixture of the second and third plastic extrudant to the first layer to produce a second layer wherein the third plastic extrudant of the mixture is visible within the second layer due to the appearance of the second plastic extrudant of the mixture.

In another embodiment the step of mixing the second and third plastic extrudants in the preceding embodiment comprising the steps of dividing the second plastic extrudant and the third plastic extrudant to produce the mixture, positioning the mixture proximate to a selection member having a plurality of outlets, and selectively expelling the mixture though the plurality of outlets such that a first portion of the mixture is expelled through a first outlet at a first instance of time and such that the first portion is not expelled from the first outlet at a second instance of time.

In another embodiment of the preceding embodiment, the step of selectively expelling the mixture comprising the steps of rotating at least one of either the selection member or the mixture relative to the other of the selection member or the mixture and applying a force to the mixture to expel the first portion through the first outlet at the first time.

In yet another embodiment, a method for producing a plastic sheet comprising the steps of extruding a first plastic extrudant having a first appearance, the first appearance being at least partially transparent and including a first color, and extruding a second plastic extrudant having a second appearance, the second appearance including a second color. The method further includes mixing the first plastic extrudant and the second plastic extrudant to produce a mixture having a non-linear pattern and producing a sheet from the mixture, the second plastic extrudant being visible within the sheet due to the appearance of the first plastic extrudant.

In another embodiment of the preceding embodiment the step of mixing the first plastic extrudant and the second plastic extrudant comprising the steps of dividing the first plastic extrudant and the second plastic extrudant to produce the mixture, positioning the mixture proximate to a selection member having a plurality of outlets, and selectively expelling the mixture though the plurality of outlets such that a first portion of the mixture is expelled through a first outlet at a first instance of time and such that the first portion is not expelled from the first outlet at a second instance of time.

In a further embodiment, an apparatus for producing a plastic extrudant comprising a first extruder configured to extrude a first plastic extrudant, a second extruder configured to extrude a second plastic extrudant, the second plastic extrudant being at least partially transparent, and a mixer coupled to the first extruder and the second extruder. The mixer being configured to produce a mixture of the first plastic extrudant and the second plastic extrudant, the mixture including a non-linear pattern. The apparatus further comprising a die coupled to the mixer to receive the mixture of the first plastic extrudant and the second plastic extrudant to produce a layer. The layer containing the non-linear pattern wherein the first plastic extrudant of the mixture is visible within the layer due to the second plastic extrudant of the mixture being at least partially transparent.

In yet a further embodiment of the preceding embodiment, the mixer comprises a housing having a first end and a second end and an interior region. The first end of the housing being configured to receive the first plastic extrudant and the second plastic extrudant and the second end of the housing being configured to expel the mixture of the two extrudants through a plurality of outlets. The mixer further comprising a shaft having a first end and a second end. The first end of the shaft located proximate to the first end of the housing and the second end of the shaft located proximate to the second end of the housing, the shaft being rotatable relative to the housing about an axis. The mixer further comprising at least one projection coupled to the shaft and rotatable with the shaft, the at least one projection configured to orient the mixture of the two extrudants relative to the plurality of outlets in the second end of the housing. The mixer further comprising a thrust bearing configured to couple the second end of the shaft to the second end of the housing to permit expulsion of the mixture in a non-linear pattern as the mixture is oriented relative to the plurality of outlets.

In another embodiment, a plastic sheet is produced comprising a first plastic extrudant and a second plastic extrudant. The second plastic extrudant is mixed with the first plastic extrudant to produce a pattern. The second plastic extrudants is at least partially transparent such that both the second plastic extrudant and the first plastic extrudant are visible in the sheet.

DETAILED DESCRIPTION OF EXEMPLARY EMBODIMENTS

Figure 1:
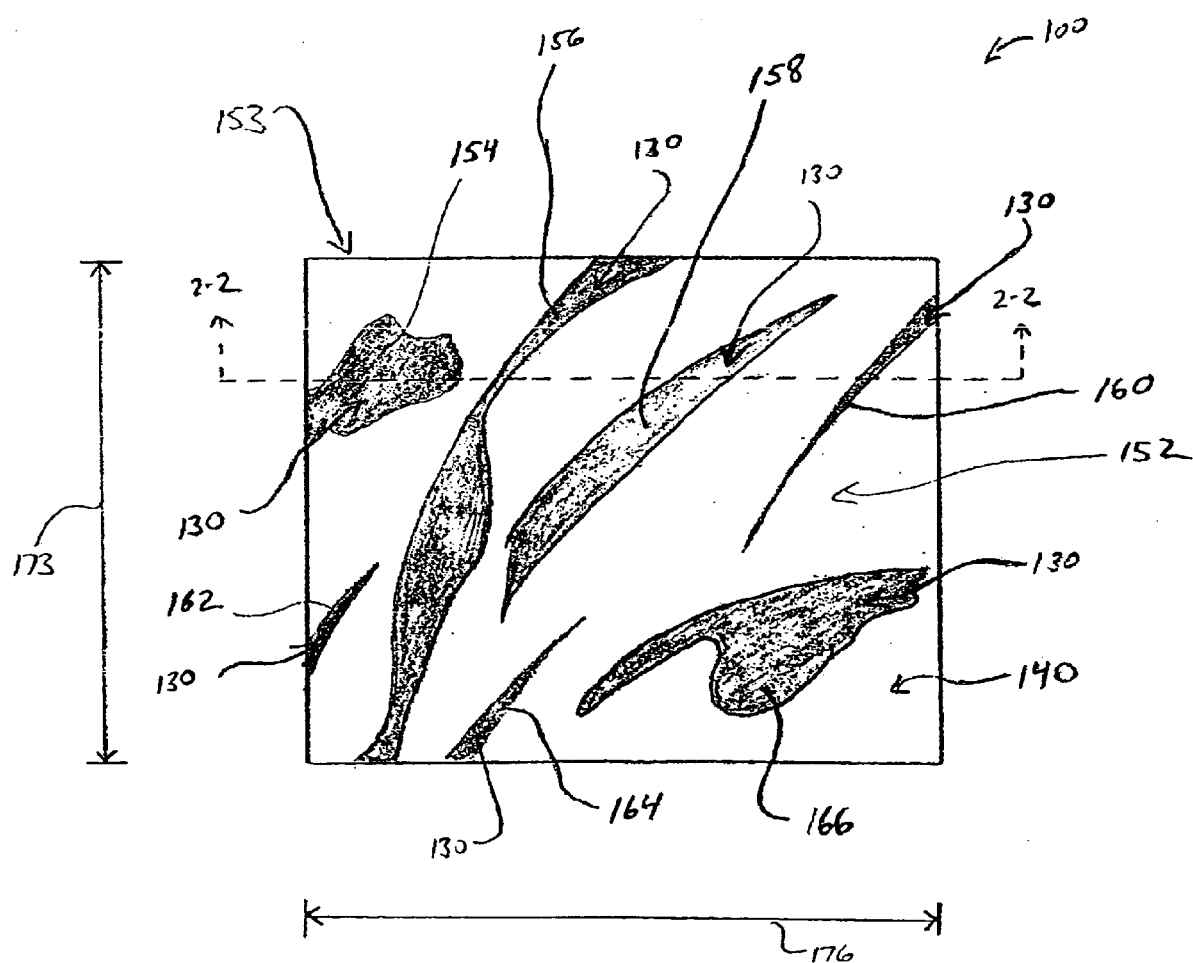
FIG. 1 is a top view of a first exemplary embodiment of a plastic sheet of the present invention.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 2:
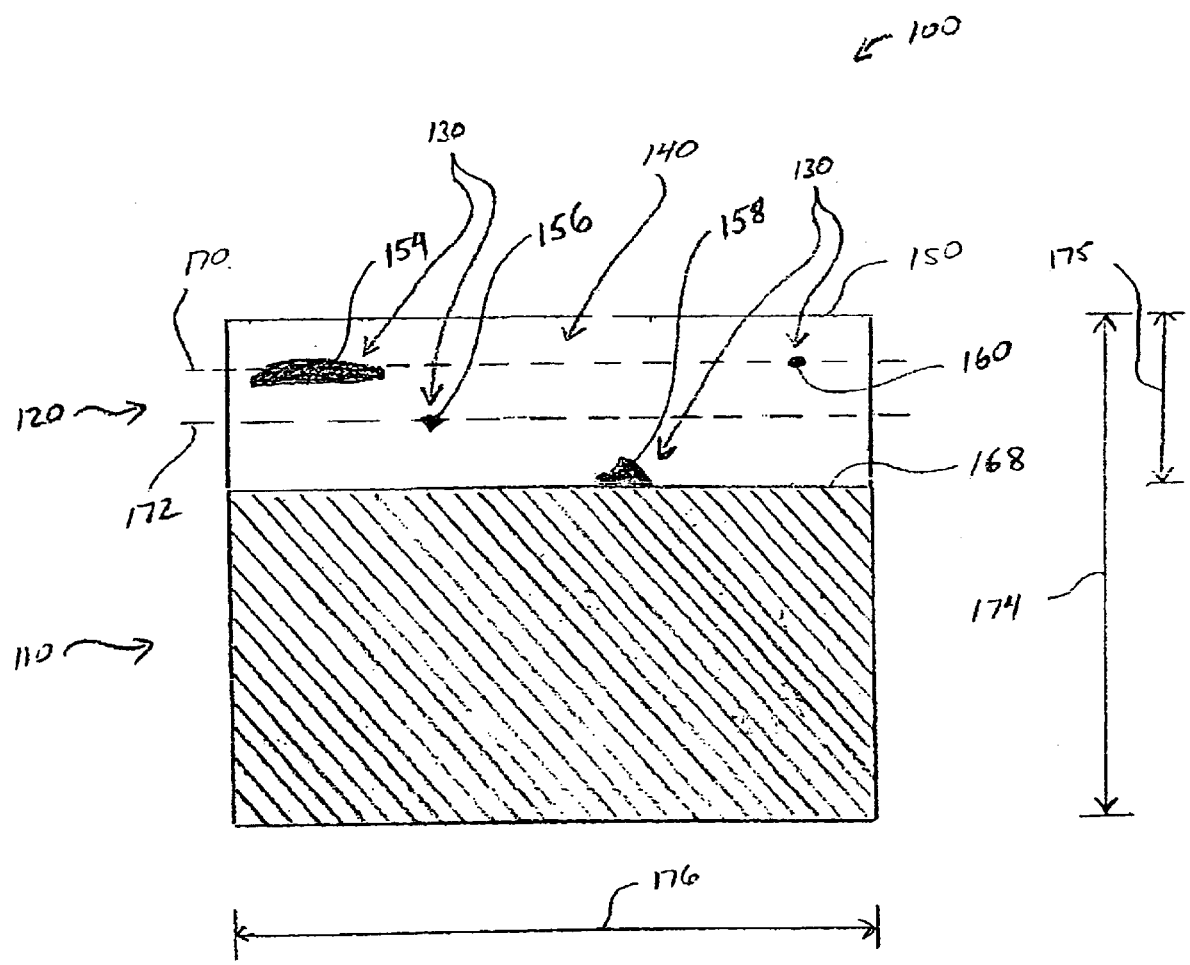
FIG. 2 is a cross-sectional view of the plastic sheet of FIG. 1 along lines 2—2.

Referring to FIGS. 1 and 2, a plastic sheet 100 is shown. Plastic sheet 100 includes a first layer 110 and a second layer 120. First layer 110, in one embodiment, is composed of a thermoplastic material, such as high density polyethylene, which has been extruded. Second layer 120, in one embodiment, includes two or more thermoplastic materials, which have been extruded and combined in accordance with the present invention. In alternative embodiments, first and second layers are formed of a thermoset material. In FIGS. 1 and 2, second layer 120 includes a material 130 and a material 140. Second layer 120 may have any number of additional materials. The present invention is not intended to be limited to only two materials in the second layer 120.

Material 130 is a thermoplastic material which has a colored appearance due to the addition of a colorant to the base plastic. In an alternative embodiment, material 130 includes a colorant and an additional additive to enhance the appearance of material 130. Example additional additives include aluminum flakes or other types of flakes for providing pearlescent effects, and flourescent dyes.

Material 140 is a thermoplastic material which has a colored appearance due to the addition of a colorant to the base plastic. In an alternative embodiment, material 140 includes a colorant and an additional additive to enhance the appearance of material 140. Example additional additives include aluminum flakes or other types of flakes for providing pearlescent effects, and flourescent dyes.

In FIGS. 1 and 2, the amount of colorant added to material 130 is such that the appearance of material 130 is opaque and the amount of colorant added to material 140 is such that the appearance of material 140 is at least partially transparent or non-opaque. Due to the partial transparent appearance of material 140, material 130 is visible within second layer 120 by an observer through an outer surface 150 of plastic sheet 100.

Referring to FIGS. 1 and 2, material 130 creates a pattern in second layer 120, such as swirl pattern 153. Material 130 is divided into pattern components or swirls 154, 156, 158, 160, 162, 164 and 166. Swirls 154, 156, 158, 160, 162, 164 and 166 are located at various positions within second layer 120, such as: at outer surface 150, at a bottom surface 168 and at intermediate positions between outer surface 150 and bottom surface 168. Referring to FIG. 2, swirl 154 and swirl 160 are located at a first intermediate position 170. Swirl 156 is located at a second intermediate position 172. Swirl 158 is located at bottom surface 168. The capacity to see the pattern 153 in material 130 even though swirls 154, 156, 158, 160, 162, 164 and 166 are at varying positions or heights in second layer 120 gives plastic sheet 100 a depth characteristic. If the appearance of material 140 was not at least partially transparent then only the pattern components which are located at outer surface 150 would be visible to an observer.

Plastic sheet 100 can be manufactured from any suitable thermoplastic material, such as polyethylene, high density polyethylene including a high molecular weight polyethylene, ABS (Acrylonitrile Butadiene Styrene) or polystyrene. In one embodiment, plastic sheet 100 has a thickness 174 in the range of 0.050 inches to 0.500 inches. In another embodiment, thickness 174 is in the range of 0.150 inches to 0.300 inches. In a preferred embodiment, thickness 174 is in the range of 0.100 inches to 0.350 inches. In one embodiment, second layer 120 has a thickness 175 in the range of 0.050 inches to 0.300 inches. In another embodiment thickness 175 is in the range of 0.050 inches to 0.250 inches. In the preferred embodiment thickness 175 is 0.250 inches. In one embodiment, plastic sheet 100 has a width 176 in the range of 4 to 90 inches. In another embodiment, width 176 is in the range of 2 to 100 inches. In yet another embodiment, width 176 is in the range of 12 to 80 inches.

Figure 3:
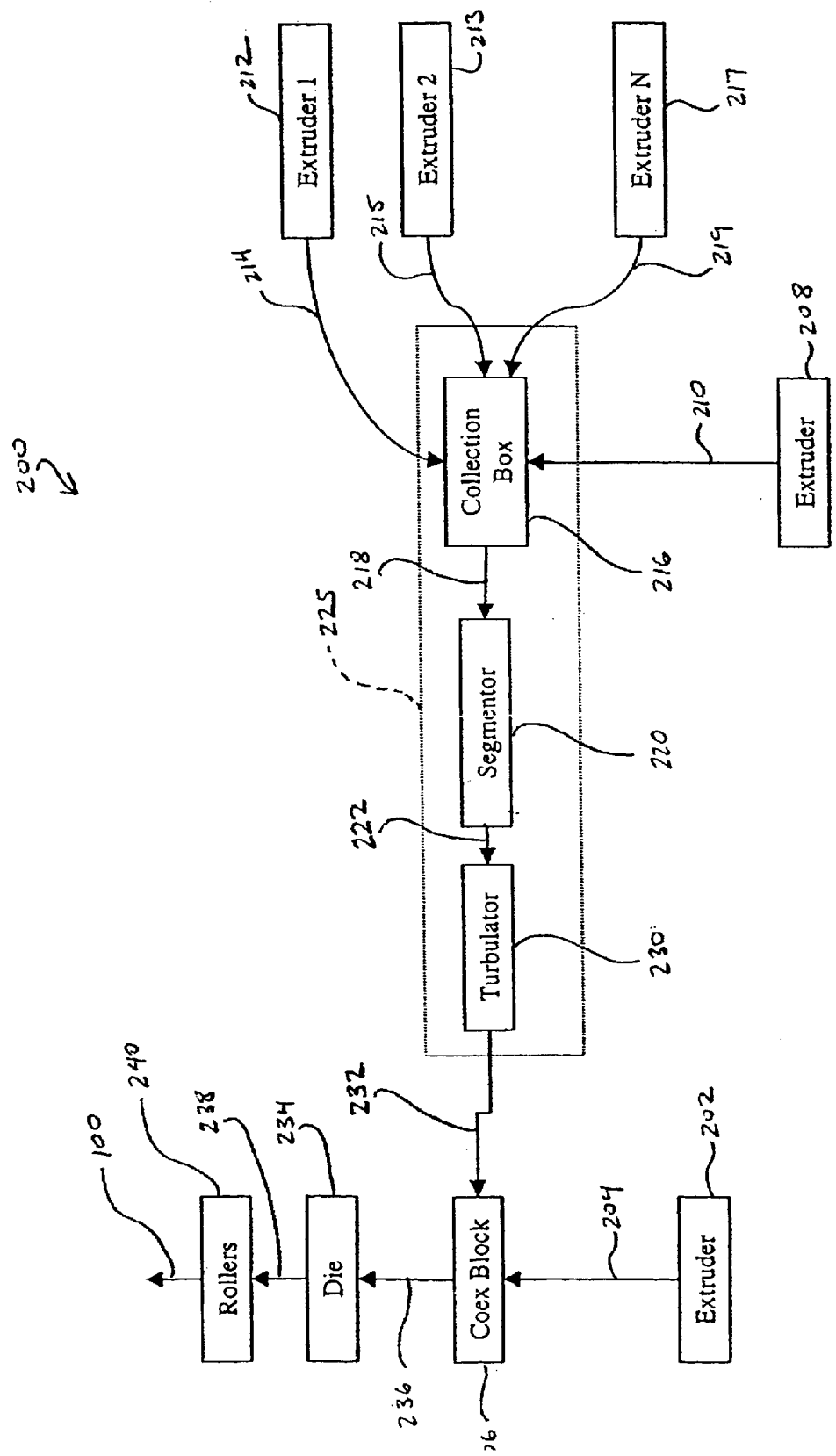
FIG. 3 is a block diagram representation of a co-extrusion process for producing the plastic sheet illustrated in FIG. 1.

Referring to FIG. 3, an exemplary embodiment 200 of the apparatus and process for manufacturing plastic sheet 100 is shown. Extruder 202 extrudes a plastic extrudant 204 which corresponds to the plastic in first layer 110. Extruder 202 is a 2 inch extruder available from Welex, Inc. located at 850 Jolly Road, Blue Bell, Pa. 19422. Plastic extrudant 204 is feed into a Co-Extrusion Block 206 available from Davis Standard located at #1 Extrusion Drive, Pawcatuck, Conn. 06379. Co-Extrusion Block 206 includes a plurality of channels one of which receives plastic extrudant 204.

Extruder 208 extrudes a plastic extrudant 210 which corresponds to the plastic in material 140 in second layer 120 in FIGS. 1 and 2. Extruder 208 is a 3.5 inch extruder available from Davis Standard. Extruder 212 extrudes a plastic extrudant 214 which corresponds to the plastic in material 130 in second layer 120 in FIGS. 1 and 2. Extruder 212 is a 2.5 inch extruder available from Welex, Inc.

Figure 4:
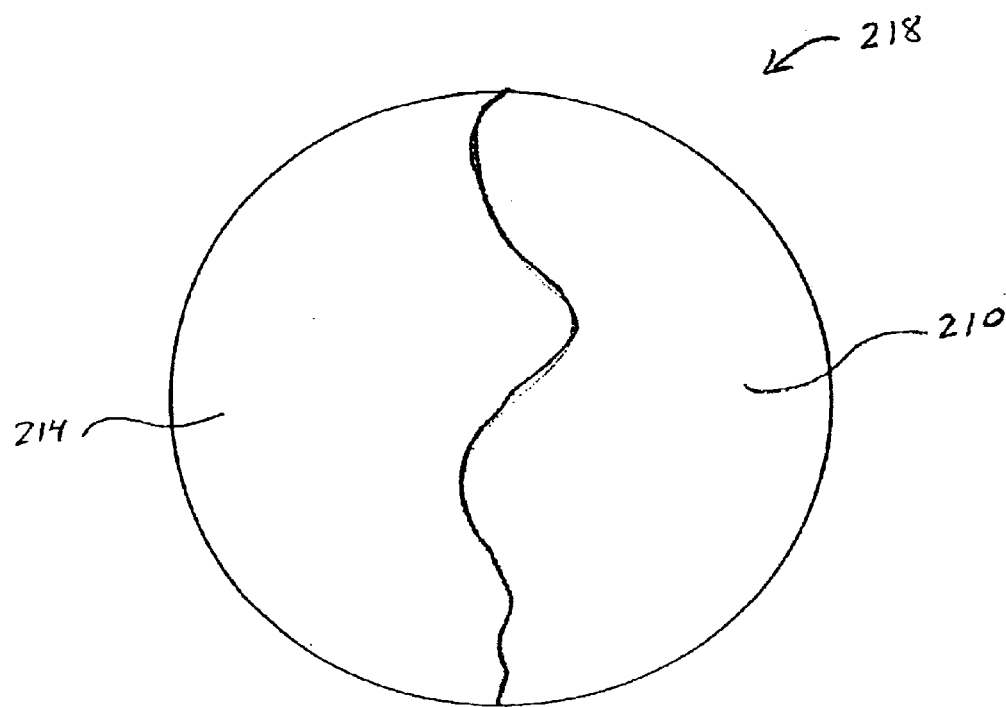
FIG. 4 is an exemplary cross-section of the plastic extrudant exiting the collection box of FIG. 3, the plastic extrudant consisting of two extrudants.

Plastic extrudants 210 and 214 are presented to a mixer 225 to produce a mixture 232. Plastic extrudants 210 and 214 are collected in a collection box 216, available from Davis Standard. Collection box 216 produces a plastic extrudant or mixture 218 which includes both plastic extrudant 210 and plastic extrudant 214. Referring to FIG. 4, plastic extrudant 210 and plastic extrudant 214 are generally segregated to separate portions of plastic extrudant 218.

In alternative embodiments, mixture 218 further includes additional plastics having appearances differing from plastic extrudants 210 and 214. In one embodiment, extruder 213 extrudes a plastic extrudant 215 which has an appearance differing from plastic extrudants 210 and 214. Plastic extrudant 215 is collected in collection box 216 along with plastic extrudants 210 and 214. Extruder 213 is manufactured by and available from Welex, Inc. In another embodiment, extruder 217 extrudes a plastic extrudant 219 having an appearance differing from plastic extrudants 210, 214 and 215. Plastic extrudant 219 is collected in collection box 216 along with plastic extrudants 210, 214 and 215. Extruder 217 is available from Welex, Inc.

In one embodiment, a green camouflage pattern is produced as second layer 120 with the mixing of the following three extrudants. Extruder 208 produces a plastic extrudant or mixture containing 99.5% of high density polyethylene (such as HMWPE) and 0.5% of color concentrate, the color being olive drab. Normally to produce an opaque extrudant, 4% of the mixture is colorant and 96% is HMWPE. By reducing the percentage of colorant used, the resultant extrudant or mixture is at least partially transparent.

In one embodiment, an ultra-violet inhibitor (UVI) stabilizer is added to the extrudant or mixture for outdoor applications of sheet 100. Extruder 208 is a 3.5 inch extruder available from Davis-Standard operating at 90 rpm (revolutions per minute) and 350–400 pph (pounds per hour). The heat profile for the extrudant is a normal profile for a 10 HLMI (high load melt index) HMWPE material with a temperature between 420° F. and 450° F. The extrudant produced by extruder 208 is collected in collection box 216.

Extruder 212 produces a plastic extrudant or mixture containing 96% HMWPE and 4% color concentrate, the color being black. Due to the 4% color concentrate, the extrudant is opaque. Extruder 212 is a 2.5 inch extruder available from Welex, Inc. operating at 2 rpm. The extrudant produced by extruder 212 is collected in collection box 216.

Extruder 213 produces a plastic extrudant or mixture containing 96% HMWPE and 4% color concentrate, the color being dark green. Due to the 4% color concentrate, the extrudant is opaque. Extruder 213 is a 2.0 inch extruder available from Welex, Inc. operating at 38 rpm. The heat profile for the extrudant is a normal profile for a 10 HLMI HMWPE material with a temperature between 420° F. and 450° F. The extrudant produced by extruder 213 is collected in collection box 216.

The extrudant exiting collection box 216 is composed of the at least partially transparent olive drab extrudant of extruder 208, the black extrudant of extruder 212, and the dark green extrudant of extruder 213. The at least partially transparent olive drab extrudant comprises the majority of the extrudant exiting collection box 216 due to the operating speeds of extruders 208, 212, 213. Extruder 208 which produces the olive drab extrudant is operating at 90 rpm and is a 3.5 inch extruder. Extruder 212 which produces the black extrudant is operating at 2 rpm and is a 2.5 inch extruder. Extruder 213 which produces the dark green extrudant is operating at 38 rpm and is a 2.0 inch extruder.

Various color variations can be achieved in second layer 120 through variations in the operating parameters of extruders 208, 212, 213 and the types and amounts of colorants used in each extruder. For example, in another embodiment, an arid camouflage pattern is produced with the same parameters as for green camouflage except that the speed of extruder 213, corresponding to the flow rate for the green extrudant, is decreased from 38 rpm to 16 rpm and the speed of extruder 212, corresponding to the flow rate for the black extrudant, is increased from 2 rpm to 4 rpm to produce a tan coloration.

Figure 5:
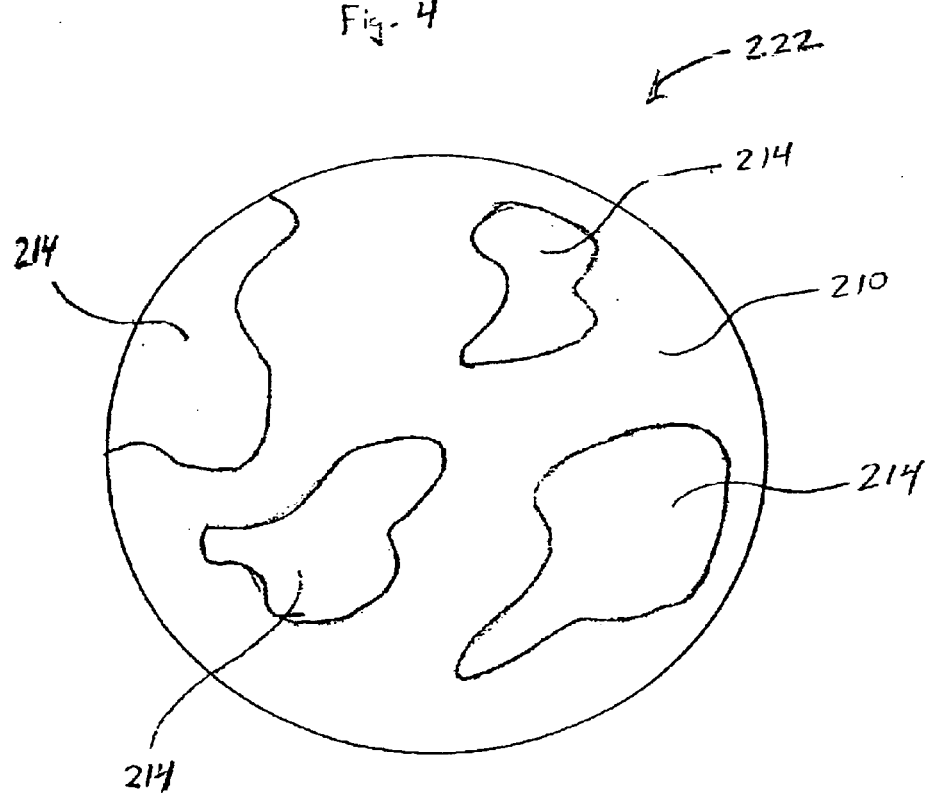
FIG. 5 is an exemplary cross-section of the plastic extrudant exiting the segmentor of FIG. 3.

Referring to FIG. 3, plastic extrudant or mixture 218 is presented to a segmentor 220 which divides plastic extrudant 210 and plastic extrudant 214 to produce a plastic extrudant or mixture 222, generally as shown in FIG. 5. Plastic extrudant or mixture 222 includes generally distinct segments of plastic extrudants 210 and 214. In one embodiment, segmentor 220 is a homogeneous mixer available from Precision Weld located at 4701 Beam Road, Charlotte, N.C. 28217. The homogenous mixer is used in general extrusion applications to equal out color and temperature variations in the extrudant or melt. This is accomplished by stationary fins in the mixer which fold the extrudant to mix the extrudant. In the application of the present invention, a smaller number of fins are used than in the general usage of a homogenous mixer. By reducing the number of fins, the extrudant or mixture 222 has the segmented appearance of FIG. 5 instead of a homogeneous appearance. In one embodiment, the homogenous mixture has 9 fins for general applications. To produce the segmented appearance of plastic extrudant 222, fewer than 9 fins are used. In preferred embodiments, 7 to 8 fins are used to segment plastic extrudants 210 and 214. In one preferred embodiment, 7 fins are used to segment plastic extrudants 210 and 214.

Plastic extrudant or mixture 222 upon exiting segmentor 220 is presented to a turbulator 230 which expels a plastic extrudant or mixture 232 which is presented to co-extrusion block 206. Plastic extrudant or mixture 232 enters co-extrusion block 206 in a separate channel from plastic extrudant 204. The channel containing plastic extrudant or mixture 232, in one embodiment, is above the channel containing plastic extrudant 206 such that second layer 120 is on top of first layer 110 in plastic sheet 100. In another embodiment, the channel containing plastic extrudant or mixture 232, is below the channel containing plastic extrudant 204 such that second layer 120 is below first layer 110 in plastic sheet 100. In yet another embodiment, extrudant or mixture 232 is fed into two channels in co-extrusion block 206 such that plastic sheet 100 is comprised of three layers, a base layer including plastic extrudant 204 and a top and bottom layer including plastic extrudant or mixture 232. Plastic extrudants 204 and 232 exit co-extrusion block 206 as plastic extrudant 236 and are fed to a sheet die 234. Die 234 produces plastic extrudant 238 which is rolled into sheet 100 by rollers 240.

Plastic sheet 100 is molded into an article for use by an end user. Examples include accessories for outdoor play equipment, such as slides, hunting accessories, such as gun cases, or canoes.

Figure 6:
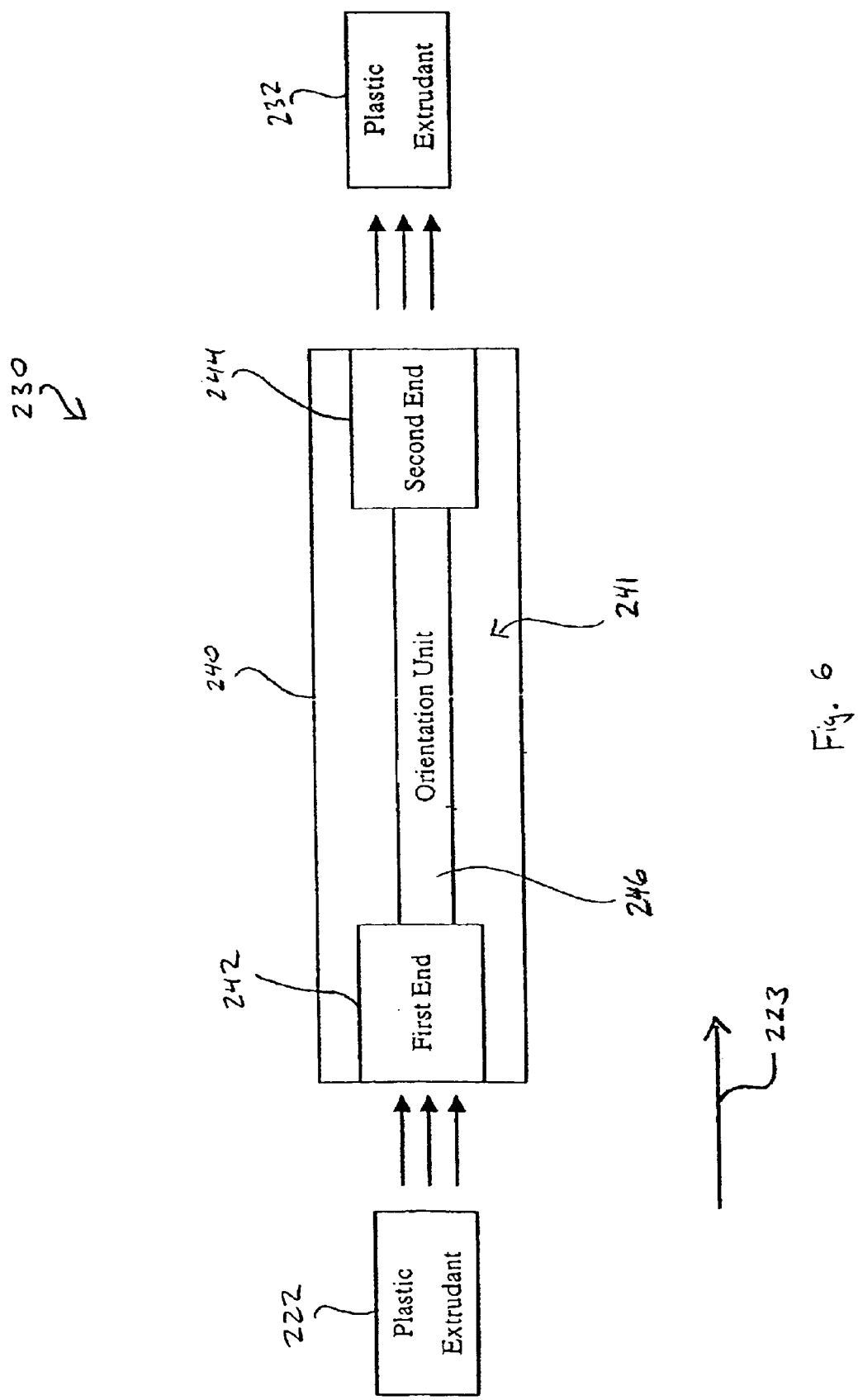
FIG. 6 is a block diagram of a turbulator or mixer used in the co-extrusion process of FIG. 3.

Referring to FIG. 6, turbulator 230 includes a housing 240 defining an interior region 241, a first end 242, a second end 244, and an orientation unit 246. A turbulator 230 is available from Precision-Weld located at 4701 Beam Road, Charlotte, N.C. 28217. However, the turbulator available from Precision-Weld must be modified in accordance with the present invention to produce plastic extrudant or mixture 232 and hence plastic sheet 100.

Figure 7:
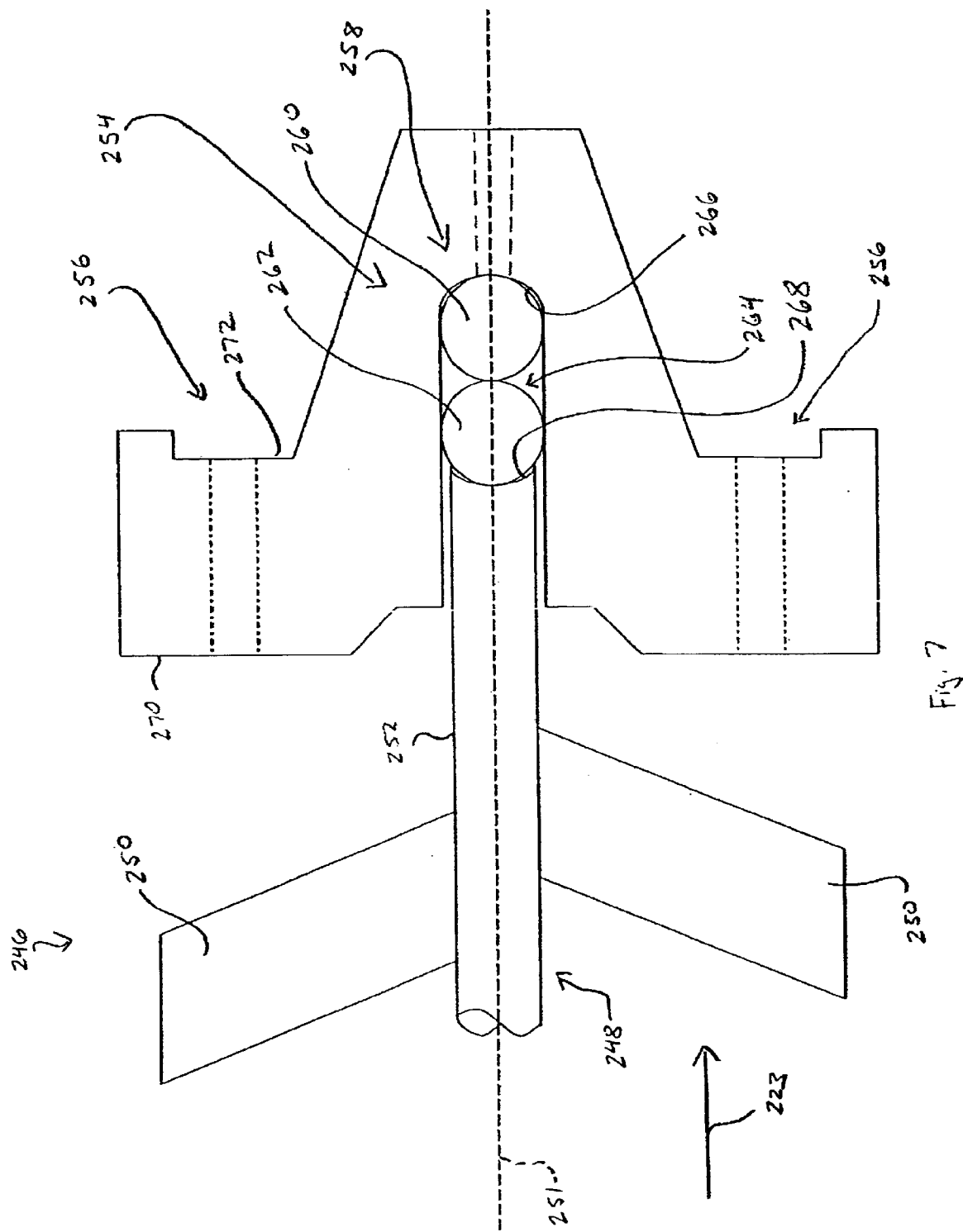
FIG. 7 is a side view of a portion of the turbulator of FIG. 6.

Referring to FIG. 7, orientation unit 246 includes a shaft 248 and projections or fins 250 extending radially from an outer surface 252 in shaft 248. The projections 250 and shaft 248 rotate along a central axis 251 of turbulator 230 due to the movement of plastic extrudant 222 in direction 223. As shaft 248 rotates, projections 250 engage plastic extrudant 222 and cause plastic extrudant 222 to rotate.

Second end 244 of turbulator 230 includes a plate or selection member 254 containing a plurality of outlets 256 and a thrust bearing 258 interposed between plate 254 and shaft 248. Thrust bearing 258 assists in the rotation of shaft 248, projections 250 and plastic extrudant or mixture 222. In alternative embodiments, additional forms of bearings are used.

In one exemplary embodiment, thrust bearing 258 is comprised of a first bearing 260 and a second bearing 262. Both first bearing 260 and second bearing 262 are positioned within a recess 264 in plate or selection member 254. First bearing 260 is positioned next to an arcuate surface 266 of recess 264. Second bearing 262 is positioned between first bearing 260 and an arcuate surface 268 of shaft 248. First bearing 260 and second bearing 262 contact each other and pivot independent of each other. In a preferred embodiment, first bearing 260 and second bearing 262 are spherical and are 0.34" in diameter.

Figure 8:
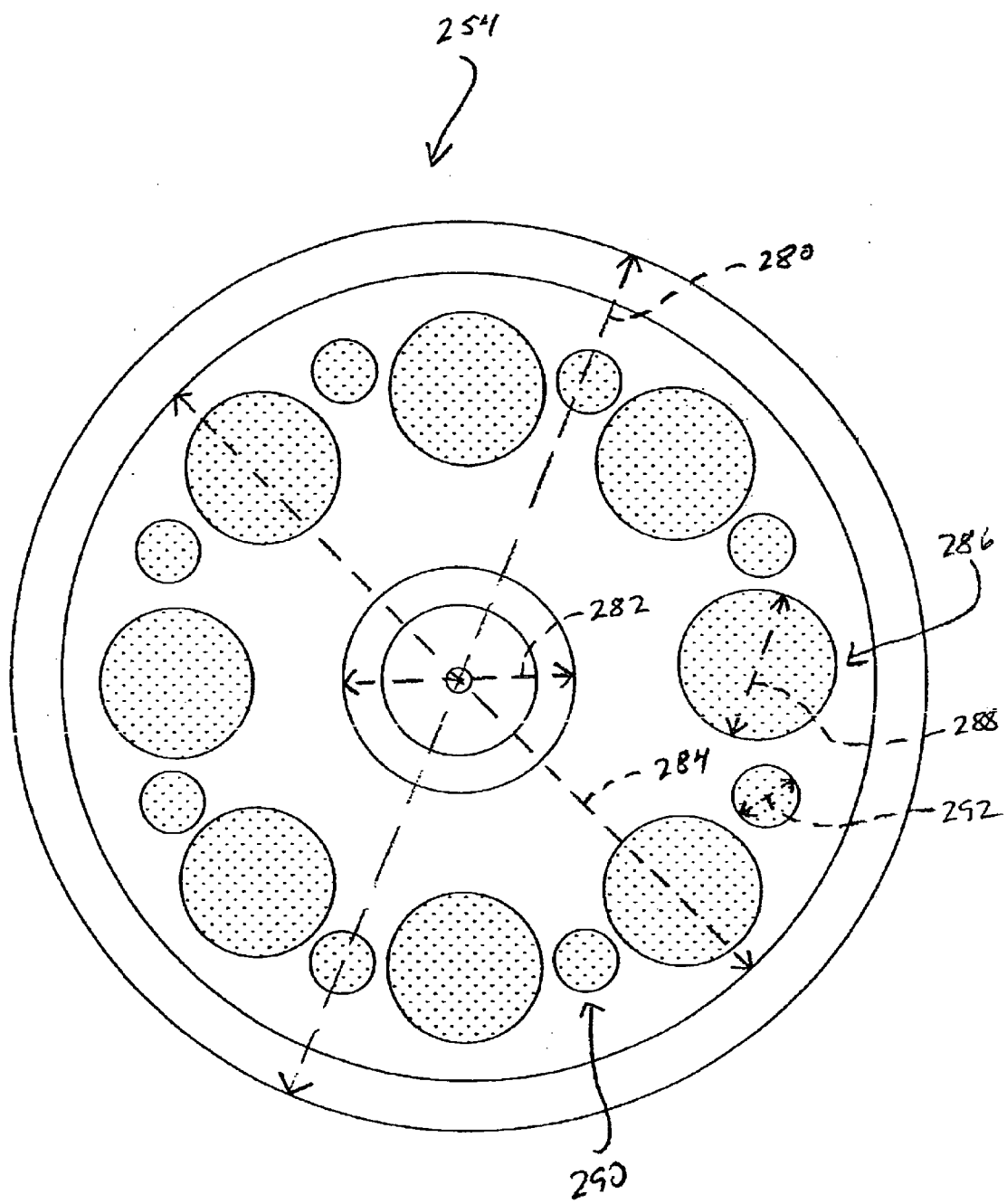
FIG. 8 is a front view of a portion of the turbulator of FIG. 6 illustrating the second end of the turbulator including the plurality of outlets.

Referring to FIGS. 7 and 8, the plurality of outlets 256 extend from a first surface 270 of plate or selection member 254 located adjacent the interior region 241 of turbulator 230 through plate or selection member 254 to a second surface 272 of plate or selection member 254. The plurality of outlets 256, permit portions of plastic extrudant 222 to be expelled from turbulator 230 as plastic extrudant 232. In one embodiment, plastic extrudant 222 is rotated relative to the plurality of outlets, to selectively expel portions of plastic extrudant 222 at various points in time. In another embodiment, the plurality of outlets are rotated due to the rotation of the selection member, to selectively expel portions of plastic extrudant 222 at various points in time.

Referring to FIG. 8, the plurality of outlets 256 are spaced around end plate 254. The size, shape and locations of the plurality of outlets are some factors which dictate the portions of plastic extrudant 222 which are expelled from turbulator 230 to produce the pattern of plastic extrudant 232. Additional factors include the rate of rotation of plastic extrudant 222, and the flow rate of plastic extrudant 222. In a preferred embodiment, plastic extrudant 222, shaft 248 and projections 250 rotate at approximately 1 rpm.

In one embodiment, plate 245 has an outer diameter 280 of 4.235 inches. The second surface 272 continuing the plurality of outlets 256 is ring shaped with an inner diameter 282 of 1.500 inches and an outer diameter 284 of 3.500 inches. The plurality of outlets 256 includes a plurality of first outlets 286 having a circular cross section having a diameter 288 of 0.5625 inches and being centered 1.125 inches from the central axis 251 of turbulator 230. The plurality of outlets further includes a plurality of second outlets 290 having a circular cross section having a diameter 292 of 0.3125 inches and being centered 1.3125 inches from the central axis 251 of turbulator 230.

Figure 9:
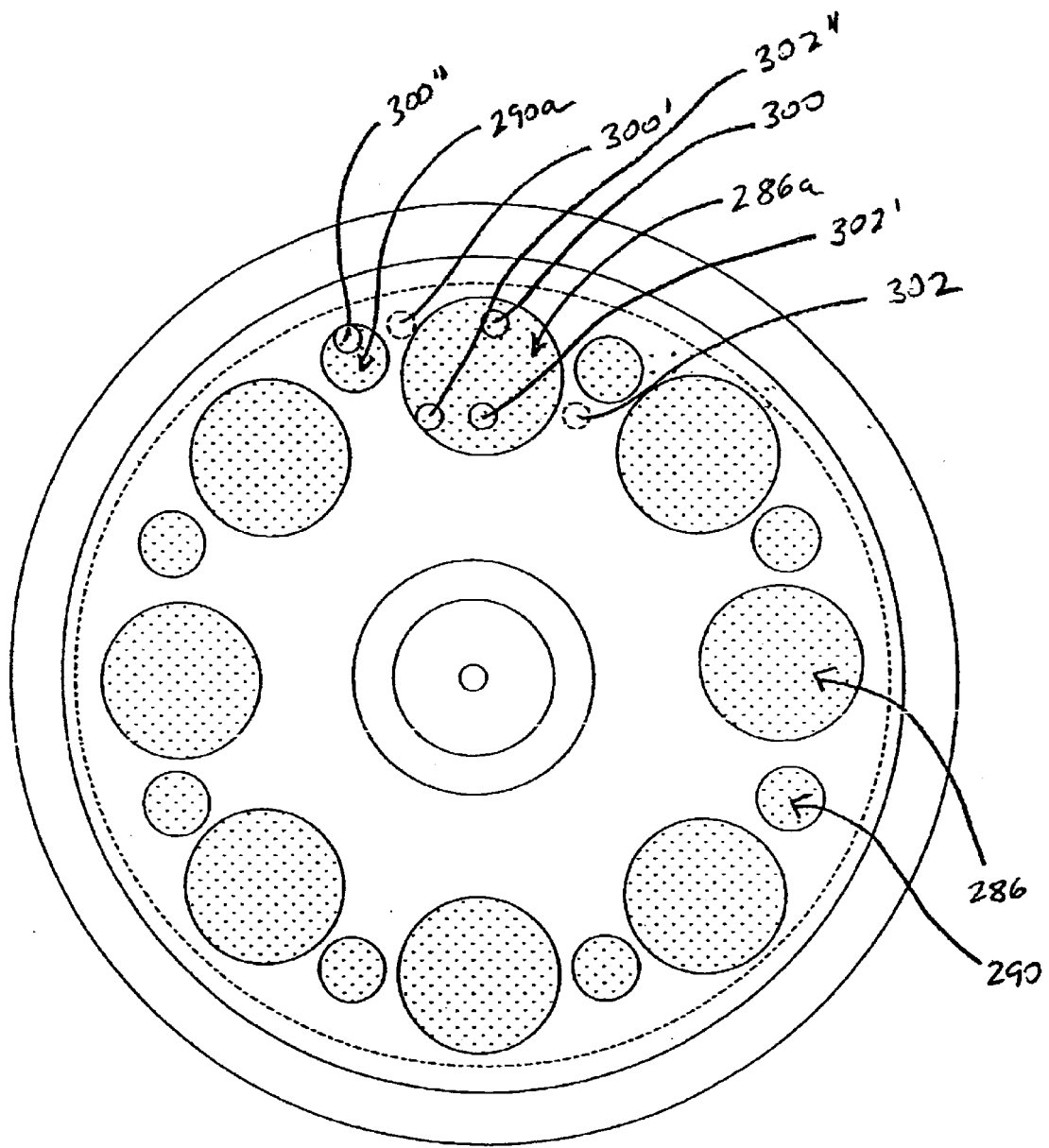
FIG. 9 is the front view of FIG. 8 including a representation of the orientation of the plastic extrudant in the interior of the turbulator relative to the plurality of outlets in the second end.

Referring to FIG. 9, the operation of turbulator 230 is illustrated for a partial rotation of shaft 248, projections 250 and plastic extrudant 222. Plastic extrudant 222 is positioned in turbulator 230 and is being oriented in time due to the rotation of shaft 248 and projections 250.

With reference to FIG. 9 the portions of plastic extrudant 222, refer to a cylindrical column of plastic extrudant 222 extending back into turbulator 230. As such, when it is stated that a particular portion has been expelled from turbulator 230, in reality only a portion of the particular portion has been expelled. Additionally, each particular portion may contain a variety of appearances at various instances of time due to the types of plastic, extrudants 210 and 214, which comprise that particular portion. The types of plastic, extrudants 210 and 214, which comprise various portions of a particular portion is governed by a number of factors including the operational parameters of extruders 208 and 212, the operational parameters of segmentor 220 including the number of fins used, and the operational parameters of turbulator 230, including the rate of rotation of the shaft 248. The preferred rates to produce a green camouflage and an arid camouflage are provided above.

Once the process is running at generally constant rates and parameters, the portions of plastic extrudant expelled from turbulator 230, repeat every revolution of plastic extrudant 222 to form multiple instances of swirl pattern 153 in second layer 120. As such, the swirl pattern 153 in plastic sheet 100 repeats itself along a length 173 of second layer 120. In one embodiment, swirl pattern 153 repeats itself 3.5 times along length 173 when second layer 120 has a length of 100 inches and a thickness of 0.25 inches.

Referring to FIG. 9, at a first instance in time a first portion 300 of plastic extrudant 222 is oriented or positioned within the extent of first outlet 286a and a second portion 302 of plastic extrudant 222 is oriented or positioned outside the extent of both first outlets 286 and second outlets 290. As such at a first instance of time, first portion 300 is expelled from turbulator 230 through first outlet 286a and second portion 302 is not expelled.

At a second instance in time, first portion 300 and second portion 302 have been rotated to second locations indicated by reference numerals 300' and 302'. At the second instance in time, first portion 300' is oriented or positioned outside the extent of first outlets 286 and second outlets 290 and second portion 302' is oriented or positioned within the extent of first outlet 286a. As such, at the second instance in time, first portion 300' is not expelled from turbulator 230 and second portion 302' is expelled through first outlet 286a.

At a third instance in time first portion 300' and second portion 302' have been rotated to third locations indicated by reference numerals 300" and 302". At the third instance in time, first portion 300" is oriented or positioned within the extent of second outlet 290a and second portion 302" is oriented or positioned within the extent of first outlet 286a. As such, at the third instance in time, first position 300" and second portion 302" are both being expelled from turbulator 230 through second outlet 290a and first outlet 286a, respectively.

At a later instance of time first portion 300" and second portion 302" return to their positions in the first instance of time such that the first portion is oriented or positioned within the extent of first outlet 286a and the second portion is oriented or positioned outside the extent of both first outlets 286 and second outlets 290. At the later instance of time a complete instance of pattern 153 has been expelled from turbulator 230 and a second instance of pattern 153 is beginning to be expelled from turbulator 230.

Figure 10:
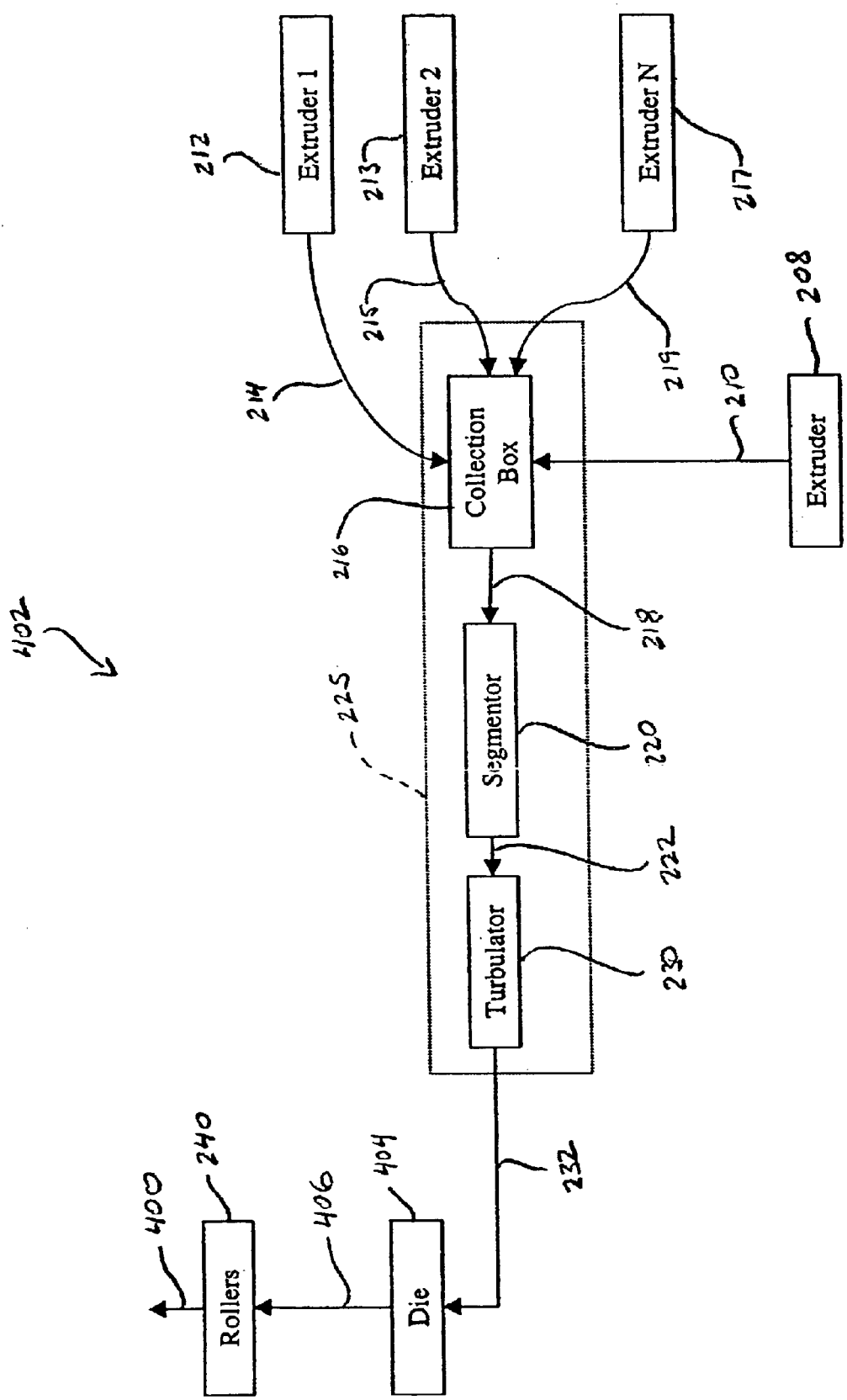
FIG. 10 is a block diagram representation of a co-extrusion process for producing a single layer plastic sheet having a pattern formed therein.

In an alternative embodiment, a single layer sheet 400 having a pattern generally identical to pattern 153 is produced. Referring to FIG. 10, an exemplary embodiment 402 of the apparatus and process for manufacturing plastic sheet 400 is shown. The components used and method of operation of embodiment 402 is generally identical to embodiment 200, shown in FIG. 3. As such, like numerals will be used for similar components and extrudants in embodiments 402 and 200. Details concerning the similar components and extrudants are provided in the detailed description of embodiment 200.

Referring to FIG. 10, the mixture 232 exits turbulator 230 and is presented to die 404. Die 404 produces plastic extrudant 406 which is rolled into sheet 400 by rollers 240. The pattern formed in sheet 400 is generally identical to pattern 153 formed in sheet 100, except that the pattern of sheet 400 is visible both through an outer or top surface and a bottom surface due to the absence of an opaque base layer.

While the invention has been illustrated and described in detail in the drawings and foregoing description, such illustration and description is to be considered as exemplary and not restrictive in character, it being understood that only exemplary embodiments have been shown and described and that all changes and modifications that come within the spirit of the invention are desired to be protected.

I claim:

1. A plastic sheet, comprising:
   a first layer comprising a first plastic extrudant; and
   a second layer having an outer surface and a bottom surface, the second layer coupled to the first layer, the second layer comprising at least a second plastic extrudant and a third plastic extrudant, wherein the second and third plastic extrudants produce a swirl pattern and wherein at least one of the second and third plastic extrudants is at least partially transparent such that both of the second and third plastic extrudants are visible in the second layer, at least a portion of the other of the second and third plastic extrudants is located at an intermediate position between the outer surface of the second layer and the bottom surface of the second layer, the portion being at least partially visible from outside the plastic sheet.

2. The plastic sheet of claim 1, wherein the at least one of the second and third plastic extrudants of the second layer has an appearance, the appearance of the at least one of the second and third plastic extrudants having a first color, and wherein the other of the second and third plastic extrudants of the second layer has another appearance, the appearance of the other of the second and third plastic extrudants having a second color.

3. The plastic sheet of claim 1, wherein the pattern includes a plurality of pattern components, a first pattern component being positioned at a first intermediate position between the outer surface and the bottom surface and a second pattern component being positioned at one of the outer surface and the bottom surface.

4. The plastic sheet of claim 2, wherein the first and second layers are made of polyethylene.

5. The plastic sheet of claim 4, wherein the second layer is comprised of at least three plastic extrudants and wherein the at least three plastic extrudants produce the swirl pattern.

6. The plastic sheet of claim 4, wherein the second layer is comprised of at least four plastic extrudants and wherein the at least four plastic extrudants produce the swirl pattern.

7. The plastic sheet of claim 2, wherein the first and second layers are made of high density polyethylene.

8. The plastic sheet of claim 2, wherein the first and second layers are made of Acrylonitrile Butadiene Styrene.

9. The plastic sheet of claim 2, wherein the first and second layers have a combined thickness in the range of 0.100 inches to 0.350 inches.

10. The plastic sheet of claim 2, wherein the second layer is made of polystyrene.

11. A plastic sheet having an outer surface and a bottom surface, the sheet comprising:
a first plastic extrudant; and
a second plastic extrudant mixed with the first plastic extrudant to produce a swirl pattern, wherein the second plastic extrudant is at least partially transparent such that both the second plastic extrudant and the first plastic extrudant are visible in the sheet, at least a portion of the first plastic extrudant is located at an intermediate position between the outer surface of the sheet and the bottom surface of the sheet, the portion being at least partially visible from outside the plastic sheet.

12. The plastic sheet of claim 11, wherein the first plastic extrudant has an appearance, the appearance of the first plastic extrudant having a first color, and wherein the second plastic extrudant has another appearance, the appearance of the second plastic extrudant having a second color.

13. The plastic sheet of claim 11, wherein the pattern includes a plurality of pattern components, a first pattern component being positioned at a first intermediate position between the outer surface and the bottom surface and a second pattern component being positioned at one of the outer surface and the bottom surface.

14. The plastic sheet of claim 12, wherein the first and second plastic extrudants are made of polystyrene.

15. The plastic sheet of claim 12, wherein the sheet is comprised of at least three plastic extrudants and wherein the at least three plastic extrudants produce the pattern.

16. The plastic sheet of claim 12, wherein the sheet is comprised of at least four plastic extrudants and wherein the at least four plastic extrudants produce the pattern.

17. The plastic sheet of claim 12, wherein the first and second plastic extrudants are made of high density polyethylene.

18. The plastic sheet of claim 12, wherein the first and second extrudants are made of Acrylonitrile Butadiene Styrene.

19. The plastic sheet of claim 12, wherein the first and second plastic extrudants are made of polyethylene.

20. A plastic sheet having an outer surface and a bottom surface, the sheet comprising:
a first plastic extrudant, the first plastic extrudant being at least partially transparent;
a second plastic extrudant, the second plastic extrudant being opaque; and
a third plastic extrudant, the third plastic extrudant being opaque, wherein the first plastic extrudant, the second plastic extrudant, and the third plastic extrudant form a camouflage pattern and wherein at least a portion of the second plastic extrudant is located at a first intermediate position between the outer surface of the sheet and the bottom surface of the sheet, the portion being at least partially visible from outside the plastic sheet.

21. The plastic sheet of claim 20, wherein the camouflage pattern is a green camouflage pattern.

22. The plastic sheet of claim 21, wherein the first plastic extrudant includes 99.5% high density polyethylene and 0.5% of olive drab color concentrate, the second plastic extrudant includes 96% high density polyethylene and 4% of black color concentrate, and the third plastic extrudant includes 96% high density polyethylene and 4% of dark green color concentrate.

23. The plastic sheet of claim 22, further comprising an ultra-violet inhibitor stabilizer.

24. The plastic sheet of claim 20, wherein the camouflage pattern is an arid camouflage pattern.

25. The plastic sheet of claim 24, wherein the first plastic extrudant includes 99.5% high density polyethylene and 0.5% of olive drab color concentrate, the second plastic extrudant includes 96% high density polyethylene and 4% of black color concentrate, and the third plastic extrudant includes 96% high density polyethylene and 4% of dark green color concentrate.

26. The plastic sheet of claim 25, further comprising an ultra-violet inhibitor stabilizer.

27. The plastic sheet of claim 20, wherein the first plastic extrudant, the second plastic extrudant, and the third plastic extrudant each include high density weight polyethylene and wherein the plastic sheet is capable of being molded into an article.

* * * * *